UNITED STATES PATENT OFFICE.

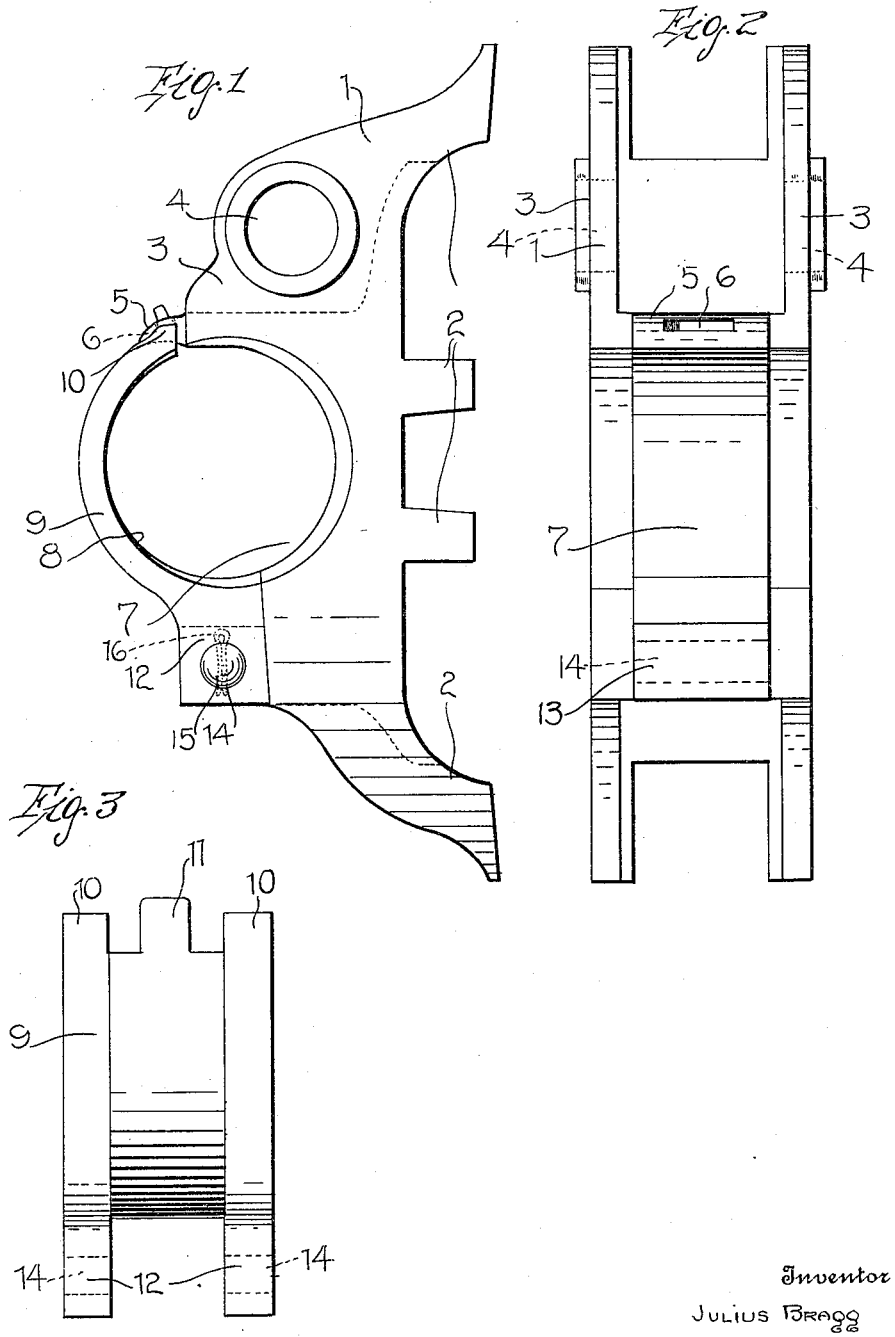

JULIUS BRAGG, OF HUNTINGTON, OREGON, ASSIGNOR, BY DIRECT AND MESNE ASSIGNMENTS, OF ONE-FOURTH TO HIMSELF, ONE-FOURTH TO SAMUEL WINCHESTER, AND ONE-FOURTH TO V. L. PLUMMER, ALL OF HUNTINGTON, OREGON, AND ONE-FOURTH TO J. F. BARNES, OF NAMPA, IDAHO.

BRAKE-HEAD.

1,137,252. Specification of Letters Patent. Patented Apr. 27, 1915.

Application filed March 29, 1913. Serial No. 757,682.

*To all whom it may concern:*

Be it known that I, JULIUS BRAGG, a citizen of the United States, residing at Huntington, in the county of Baker and State of Oregon, have invented certain new and useful Improvements in Brake-Heads, of which the following is a specification, reference being had to the accompanying drawings.

This invention relates to new and useful Improvements in brake heads, the object being to construct a simple and durable brake head which can be quickly removed and replaced by a new one, thus doing away with a great deal of delay on the fast mail and passenger trains.

Another object of the invention is to provide a brake head of the above character which will possess advantages in points of efficiency and durability, is inexpensive of manufacture and at the same time is simple in construction and operation.

With the above and other objects in view, the invention consists in the novel features of construction and the combination and arrangement of parts to be hereinafter more fully described, pointed out in the claim and shown in the accompanying drawings, in which—

Figure 1 is a side elevation of a brake head constructed in accordance with my invention; Fig. 2 is a top plan view, the cover plate being removed; and Fig. 3 is a top plan view of the cover plate.

Referring more particularly to the drawings, 1 indicates the brake head which is provided upon one side thereof with the usual shoe securing means 2 which includes the divergent end lugs and the spaced central lugs. Formed at one end of the brake head are the projecting flanges 3 which are provided with the alined openings 4 adapted to receive the usual form of hanger, it being understood that any form of hanger may be used. The body of the brake head is provided at one end with a flange 5 which projects beyond the edges of the flanges 3 and is provided with a centrally arranged opening 6.

The brake head 1 is provided with a centrally arranged semicircular bearing 7 which corresponds with the semicircular bearing 8 in the cover plate 9. The cover plate 9 is provided at one end with the spaced ears 10 and further provided with the outwardly projecting lug 11 which is centrally arranged between the ears 10. In placing the cover plate 9 in position, the lug 11 is adapted to be disposed within the opening 6 formed in the projecting flange 5 whereby the cover plate 9 may be readily removed or replaced when desired. At the other end of the cover plate are provided ears 12 arranged upon opposite sides of the projecting lug 13 formed upon the body of the brake head and disposed adjacent one side of the bearing 8. The ears 12 and the lug 13 are provided with alined openings 14 adapted to receive the transverse securing pin 15 whereby the cover plate 9 is securely held in its locked position. As shown, a cotter pin 16 is inserted in the end of the pin 15 to prevent the removal of the same until it is desired to remove the cover plate 9.

In applying my improved brake head to the brake beam, the brake beam is arranged within the bearing 8, the lug 11 of the cover plate 9 is then arranged within the opening 6. The brake head is then secured to the beam by inclosing the brake beam with the cover 9, the ears 12 being disposed upon opposite sides of the lug 13 and the pin 15 arranged in position to securely lock the cover in place. From the above it will be readily apparent that my improved brake head may be quickly removed and replaced by a new one in a very short space of time, thus doing away with the usual delays of fast mail or passenger trains, which generally occurs during the exchange of the brake head should one become broken. It will be readily apparent that the brake head may be quickly removed by the removal of the pin 15 and the cover 9 and the brake head itself slipped off of the hanger.

From the above description taken in connection with the accompanying drawings, it will be readily apparent that I have provided a simple and durable brake head which can be quickly and readily applied to the brake beam or easily removed therefrom. It will also be apparent that the brake head in itself is extremely simple in construction and can be manufactured at a comparatively low cost.

While I have shown and described the preferred form of my invention, it is obvious that various changes in the details of construction can be resorted to for successfully carrying my invention into practice without sacrificing any of the novel features or departing from the scope of the appended claim.

What I claim is:—

A brake head comprising a body having a substantially semi-circular bearing face, an upwardly projecting flange formed on the body at one side of the bearing face and having a centrally arranged opening, a cover plate having a semi-circular bearing face therein arranged in opposed relation with the first bearing face, a lug formed on one end of the cover plate and removably disposed within said opening, spaced ears projecting from the cover plate and adapted to be disposed upon opposite sides of the flange and contacting therewith to prevent lateral movement of the cover plate, a lug formed upon the body and arranged at the opposite side of the bearing face, spaced ears formed upon the end of the cover plate opposite the lug and adapted to be disposed upon opposite sides of the lug of the body, said lug and second pair of ears being provided with alined openings, and a securing pin removably arranged within said openings to lock the cover plate in position.

In testimony whereof I hereunto affix my signature in the presence of two witnesses.

JULIUS BRAGG.

Witnesses:
CLARK ADAMS,
E. M. CHAMBERLAIN.